US008624910B2

(12) United States Patent
Lindholm et al.

(10) Patent No.: US 8,624,910 B2
(45) Date of Patent: Jan. 7, 2014

(54) REGISTER INDEXED SAMPLER FOR TEXTURE OPCODES

(75) Inventors: John Erik Lindholm, Saratoga, CA (US); Yan Yan Tang, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 585 days.

(21) Appl. No.: 12/868,586

(22) Filed: Aug. 25, 2010

(65) Prior Publication Data

US 2011/0069076 A1   Mar. 24, 2011

Related U.S. Application Data

(60) Provisional application No. 61/245,104, filed on Sep. 23, 2009.

(51) Int. Cl.
| | |
|---|---|
| G09G 5/00 | (2006.01) |
| G06F 13/00 | (2006.01) |
| G06T 15/00 | (2011.01) |
| G06T 11/40 | (2006.01) |
| G06K 9/40 | (2006.01) |
| G06K 9/36 | (2006.01) |
| G06K 9/54 | (2006.01) |
| G06F 15/00 | (2006.01) |
| G06F 9/30 | (2006.01) |
| G06F 9/40 | (2006.01) |

(52) U.S. Cl.
USPC ........... 345/582; 345/503; 345/522; 345/536; 345/552; 382/305; 382/260; 382/274; 382/276; 382/303; 711/100; 711/118; 711/119; 712/21; 712/203; 712/205; 712/220; 718/107

(58) Field of Classification Search
USPC ................. 345/418, 581–582, 589, 614, 618, 345/501–503, 506, 520, 522, 530, 536–538, 345/548–552, 553; 382/254, 260–269, 274, 382/276, 285, 300, 303–305, 307; 711/5, 711/100, 113, 118–120, 119, 125, 168–170, 711/213, 215; 712/1, 9–10, 19–21, 25, 31, 712/34, 200, 203, 205–206, 220, 224, 235; 718/100–101, 106–107
See application file for complete search history.

(56) References Cited

U.S. PATENT DOCUMENTS

| | | | | |
|---|---|---|---|---|
| 6,269,391 B1 * | 7/2001 | Gillespie | ....................... | 718/100 |
| 7,256,796 B1 * | 8/2007 | Bastos et al. | .................. | 345/614 |
| 7,411,592 B1 * | 8/2008 | Dunn | ............................ | 345/581 |
| 7,773,092 B1 * | 8/2010 | Heckbert | ....................... | 345/582 |
| 7,948,495 B1 * | 5/2011 | Nordquist et al. | ............ | 345/522 |
| 8,189,009 B1 * | 5/2012 | Brown et al. | .................. | 345/582 |
| 2006/0212681 A1 * | 9/2006 | Codrescu et al. | ............. | 712/214 |
| 2008/0109795 A1 * | 5/2008 | Buck et al. | ..................... | 717/137 |
| 2008/0198169 A1 * | 8/2008 | Boyd et al. | .................... | 345/522 |
| 2008/0246773 A1 * | 10/2008 | Jiao et al. | ....................... | 345/522 |
| 2009/0147017 A1 * | 6/2009 | Jiao | ................................. | 345/582 |
| 2010/0002000 A1 * | 1/2010 | Everitt et al. | .................. | 345/426 |
| 2010/0122042 A1 * | 5/2010 | Lin | ................................. | 711/154 |

* cited by examiner

*Primary Examiner* — Wesner Sajous
(74) *Attorney, Agent, or Firm* — Patterson & Sheridan, L.L.P.

(57) ABSTRACT

One embodiment of the present invention sets forth a technique for dynamically specifying a texture header and texture sampler using an index. The index corresponds to a particular register value that may be static or computed during execution of a shader program. Any texture operation instruction may specify an index value for each of the texture header and the texture sampler.

18 Claims, 8 Drawing Sheets

REGISTER INDEXED SAMPLER FOR TEXTURE OPCODES

CROSS-REFERENCE TO RELATED APPLICATIONS

This application claims priority benefit to U.S. provisional patent application titled, "Register Indexed Header/Sampler ID for Texture Opcodes," filed on Sep. 23, 2009 and having Ser. No. 61/245,104.

BACKGROUND OF THE INVENTION

1. Field of the Invention

The present invention generally relates to specifying texture header and texture sampler values for texture map operations.

2. Description of the Related Art

Execution of a texture fetch operation requires the specification of a texture header and a texture sampler which together describe the texture data (format and particular texture map) to be sampled and the filter to be applied to the sampled texture map to produce filtered texels for a pixel. Traditionally these have been specified by immediate values, meaning that the identity of the particular texture header and the particular texture sampler is static specified for the instruction at the time that a shader program including the texture fetch operation is compiled for execution by a processor.

When a graphics API such as Direct X 10 is used, a texture fetch instruction may not be used within an if-else statement. Therefore, different texture header and/or sampler may not be specified as inputs to a texture fetch operation in the "if" clause compared with a texture fetch operation in the "else" clause. Dynamic selection of different texture headers and/or samplers during execution of a shader program may not be possible.

Accordingly, what is needed in the art is a system and method for dynamically specifying a texture sampler and texture header for texture operations during execution of a shader program.

SUMMARY OF THE INVENTION

A system and method for dynamically specifying a texture header and texture sampler using an index. The index corresponds to a particular register value that may store static value or a value that is computed during execution of a shader program. Any texture operation instruction may specify an index for each of the texture header and the texture sampler. A single index may specify a unique texture header or texture sampler for each pixel that is processed by a thread in a thread group when the shader program is executed in a multi-threaded processor.

Various embodiments of a method of the invention for dynamically determining a texture sampler for a texture operation instruction include receiving a texture operation instruction and determining that the texture operation instruction specifies a first index associated with the texture sampler. A texture sampler is read from a first register using the first index. Texture data is sampled according to a sampling pattern corresponding to the texture sampler. The sampled texture data is filtered to produce filtered texture data for a pixel.

Various embodiments of the invention include a system for dynamically determining a texture sampler for a texture operation instruction.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
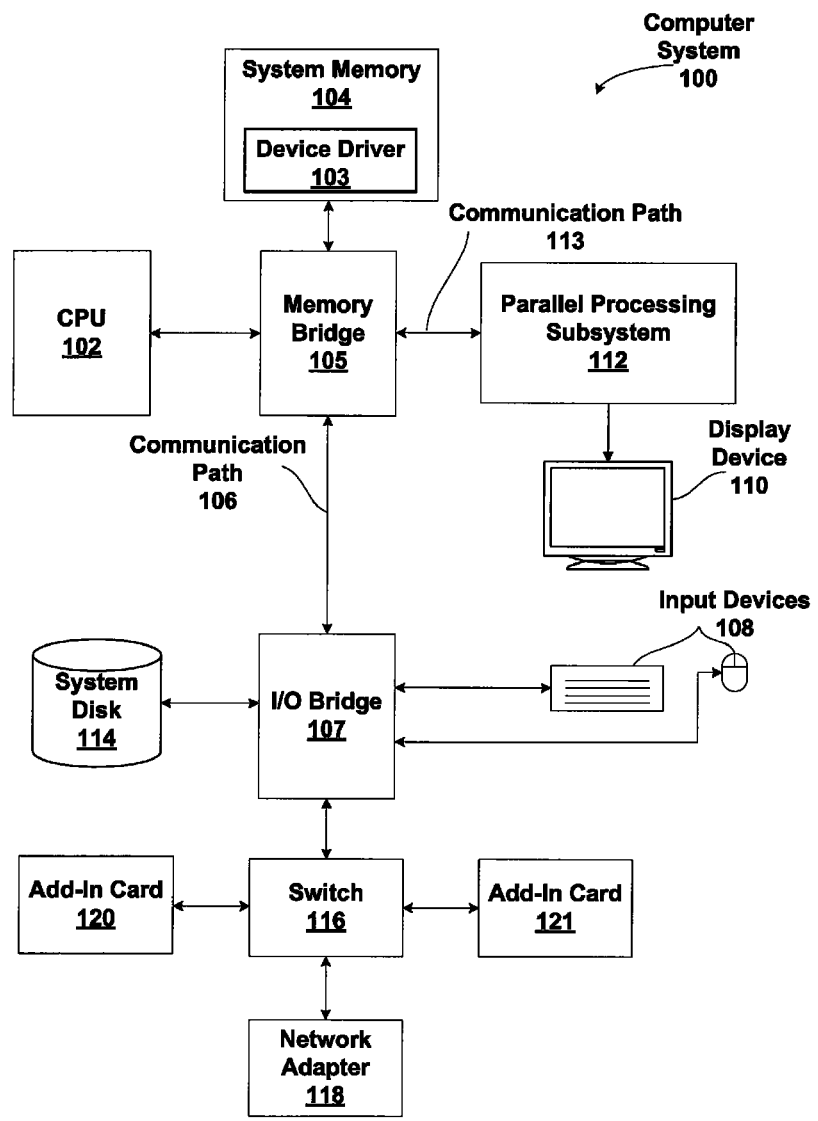
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
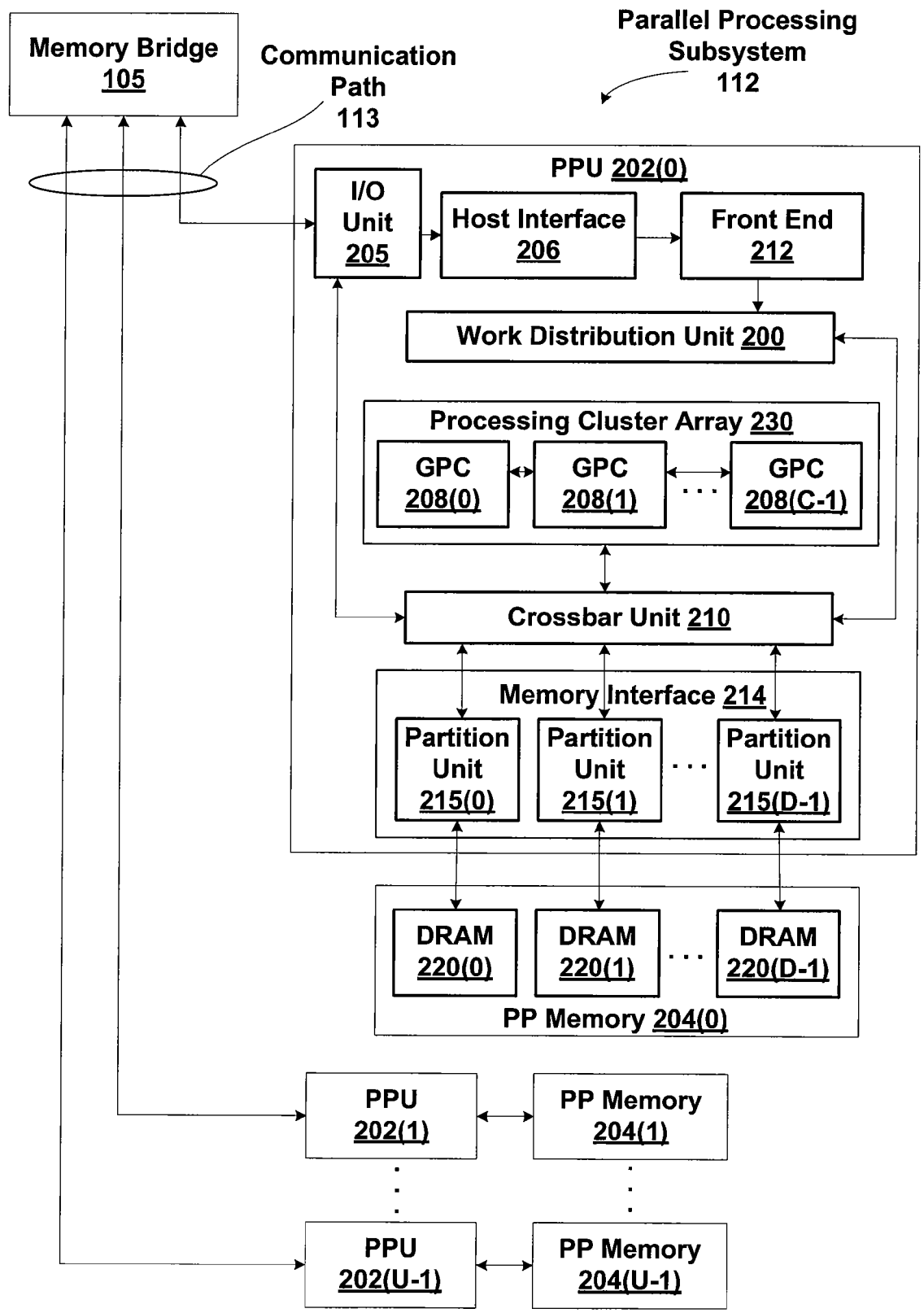
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
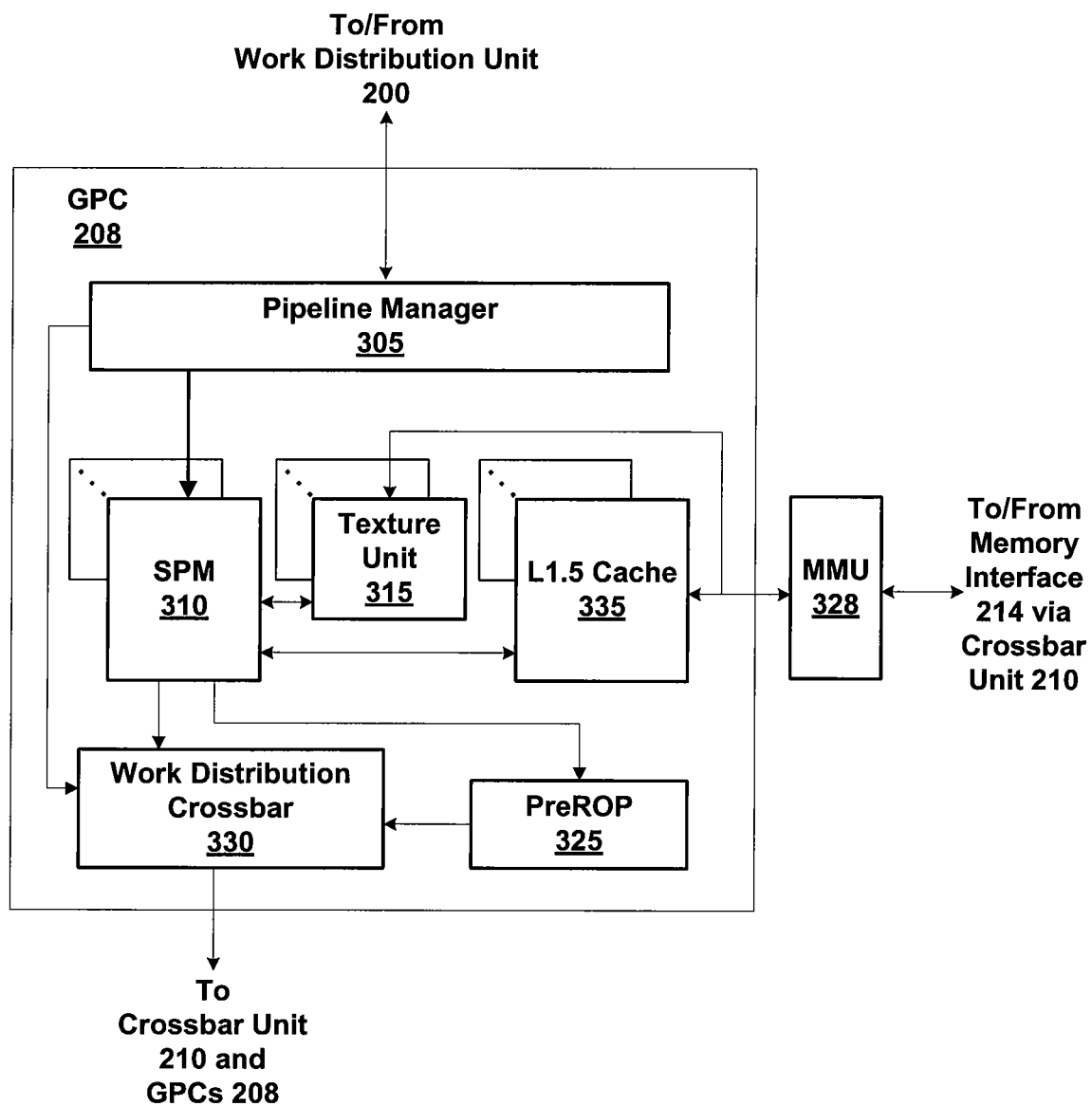
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads (also referred to as a warp) concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The physical address is processed to distribute surface data access locality to allow efficient request interleaving among partition units. The cache line index may be used to determine whether of not a request for a cache line is a hit or miss.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
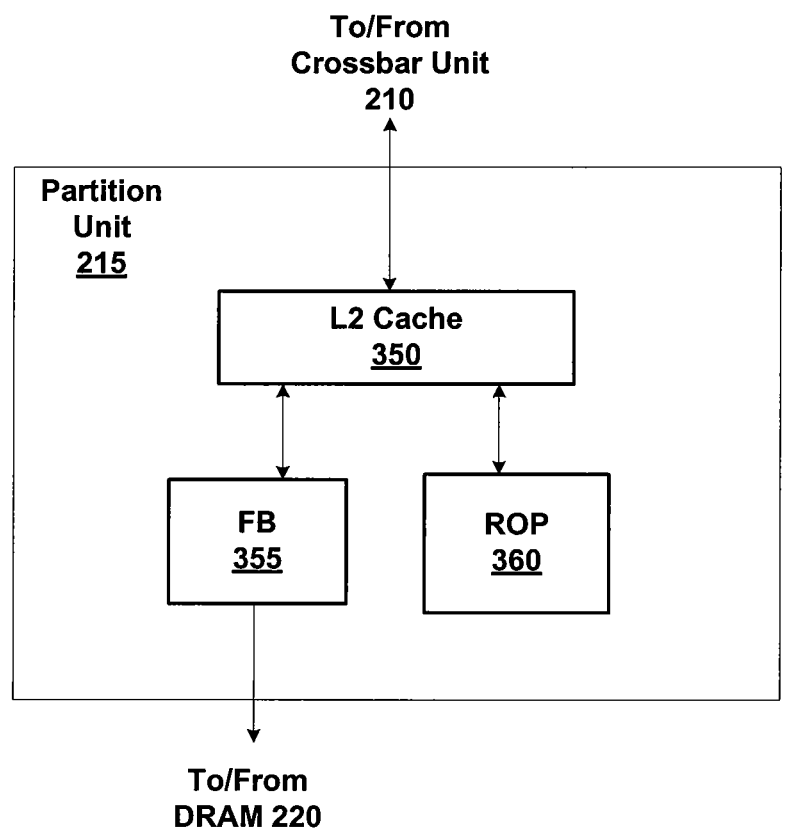
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 4:
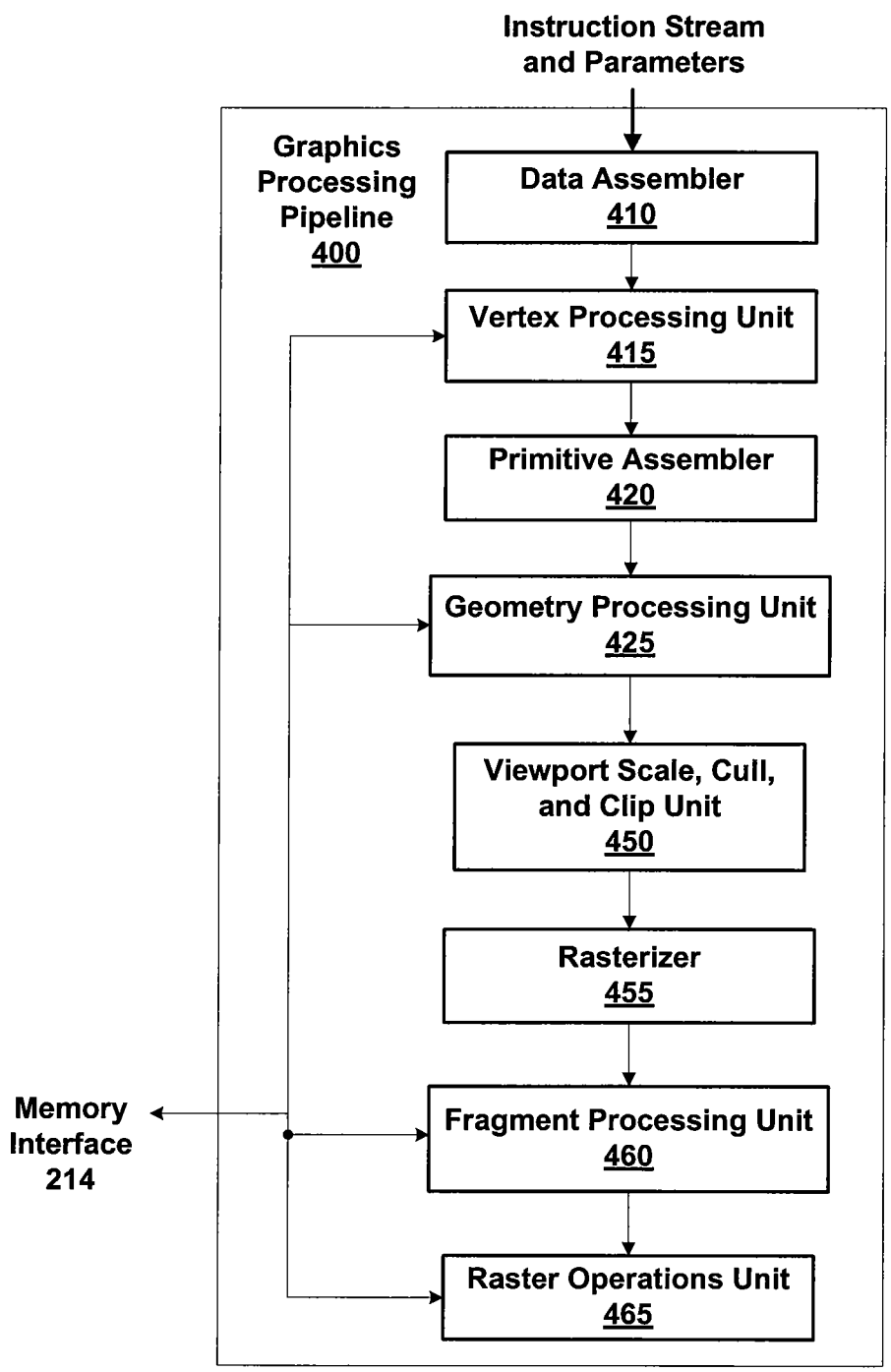
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Indexed Texture Headers and Samplers

Any texture operation instruction may specify an index value for each of the texture header and the texture sampler. Therefore, the texture header and texture sampler may be specified dynamically during execution of the texture operation instruction. A texture fetch operation instruction, TEX, includes a .I specifier that has either a TRUE or FALSE value. When the .I specifier is FALSE, the operands are used directly as immediate values of the texture sampler and texture header. When the .I specifier is TRUE, the operands are used as indices for the texture sampler and texture header. The code shown in TABLE 1 illustrates an embodiment of a format for the texture fetch operation, where #tidU08 and #smpU05 are operands for an immediate (8 bit) texture header and an immediate (5 bit) texture sampler, respectively. When the .I identifier is TRUE the #tidU08 and #smpU05 operands are ignored and the texture header index and texture sampler index are specified by the Ra operand. Additional specifiers and operands may be included in the texture fetch operation instruction. Other embodiments may use a different format for specifying the texture header index and texture sampler index.

TABLE 1

Texture Fetch Operation Instruction Format

TEX{.I} Rd, Ra, #tidU08, #smpU05;
.I: Indexed texture header and sampler supplied
    Header (U09) and sampler (U07) are packed in Ra as:
        header[31:23] | sampler[22:16]
tidU08: texture header id
    The texture target is given by tidU08: The low 7-bits specify texture target (0-127).
smpU05: texture sampler id
    The sampler to be used is smpU05: The low 4 bits specify the sampler (0-15).

The texture coordinates (s, t, and r) are stored in vector registers Ra and Rb and the result of the texture fetch operation is written back starting at register Rd. When .I is TRUE, the texture header and texture sampler indices are also stored in Ra (the header is stored in bits [31:23] and the sampler is stored in bits [22:16]). An array index may also be stored in Ra when .I is TRUE. In one embodiment Rb stores a level-of-detail mipmap bias, and a programmable texel offset.

Figure 5A:
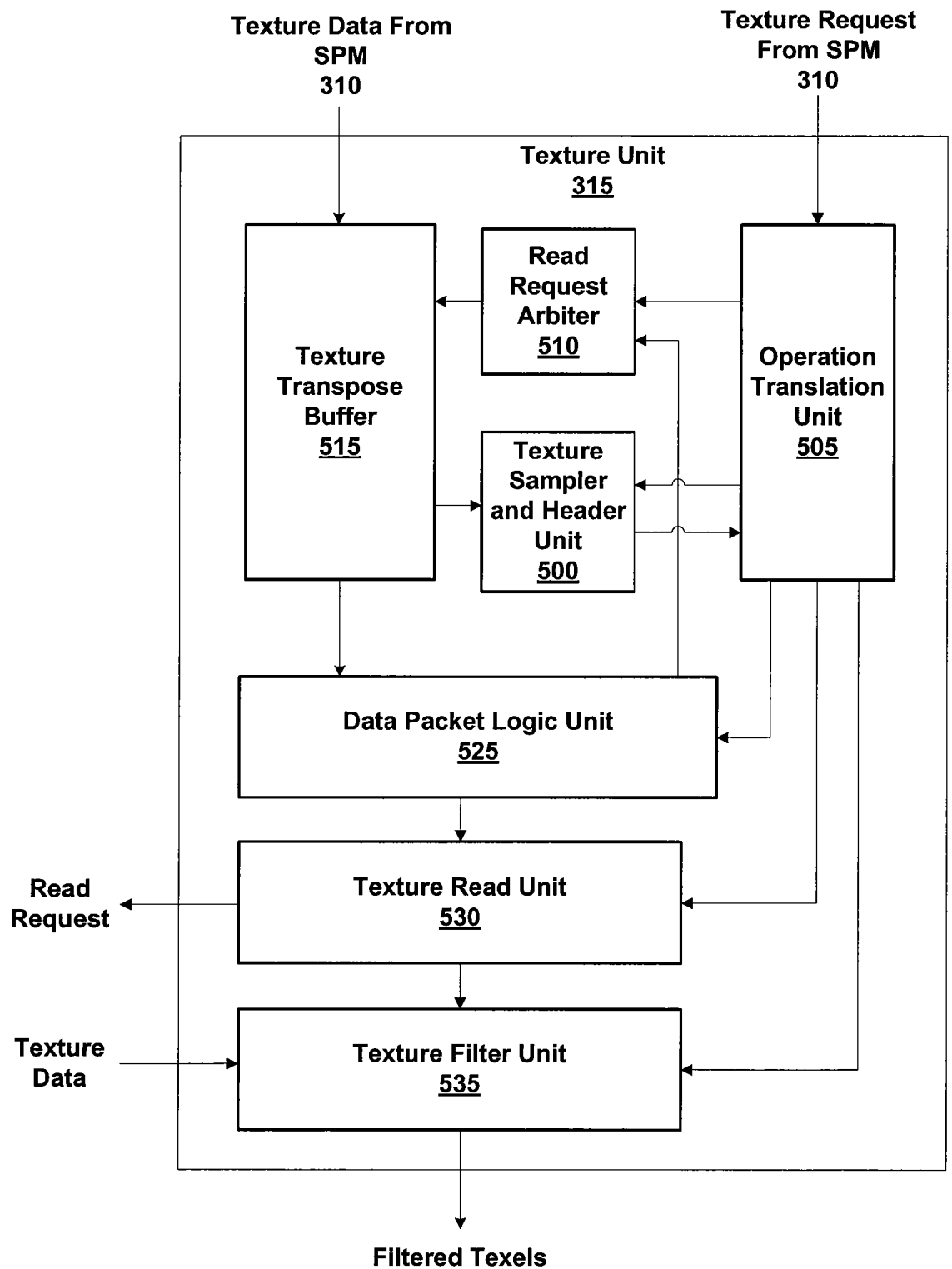
FIG. 5A is a block diagram of the texture unit of FIG. 3A, according to one embodiment of the present invention.

FIG. 5A is a block diagram of the texture unit 315 of FIG. 3A, according to one embodiment of the present invention. The texture unit 315 includes an operation translation unit 505, a read request arbiter 510, a texture transpose buffer 515, a texture sampler and header unit 500, a data packet logic unit 525, a texture read unit 530, and a texture filter unit 535. The operation translation unit 505 is responsible for formatting texture operation instructions that are received from SPM 310. When the operation translation unit 505 receives an instruction that has the .I specifier set to TRUE, the operation translation unit 505 issues a read request with the indices to the read request arbiter 510 to read the texture header and texture sampler values that are stored in the texture transpose buffer 515. The texture header and texture sampler values may be written to the texture transpose buffer 515 by the SPM 310 at any point during execution of a shader program before the texture sampler and texture header values are needed by a texture operation instruction. In addition to storing texture header and texture sampler values, the texture transpose buffer 515 also stores texture coordinates. After all of the texture coordinates for a particular texture operation instruction are stored in the texture transpose buffer 515, the SPM 310 issues the actual texture operation instruction to the operation translation unit 505.

The read request arbiter 510 arbitrates between read requests for texture headers and samplers that are received from the operation translation unit 505 and read requests for texture coordinates received from the data packet logic unit 525. The read requests for indexed texture headers and texture samplers use a common address for all of the banks within the texture transpose buffer 515 since no transposing is required to read the indexed texture headers and texture samplers. The read requests generated by the data packet logic unit 525 for texture coordinates may use a different read address for each bank within the texture transpose buffer 515. Therefore, the data packet logic unit 525 also generates a control for configuring read crossbar multiplexors in the texture transpose buffer 515. A single quad of texture coordinates is output by the texture transpose buffer 515 per clock cycle since the texture operation instructions is executed to a quad of pixels each cycle. A quad of pixels is a 2×2, 1×4, or 4×1 set of pixels.

For non-indexed texture operation instructions, since the texture header and texture sampler is specified via immediate in the instruction, all threads within the same thread group will share the same texture header and texture sampler value. However, when the texture operation instruction specifies a texture sampler index and texture header index, each thread (processing a pixel) can have a different texture sampler value and a different texture index value stored in the texture transpose buffer 515. When two or more active threads that process a pixel quad have different texture sampler values or different texture header values, the threads diverge and the texture sampler and header unit 500 serializes output of the pixel-specific texture sampler and header values for the pixel quad. The texture sampler and header unit 500 receives the indexed texture samplers and texture headers for a thread group read from the texture transpose buffer 515 and receives the immediate texture sampler and texture header for a thread group from the operation translation unit 505. The texture sampler and header unit 500 outputs a per-quad (or a per-pixel when the threads for a pixel quad diverge) texture sampler and texture header to the data packet logic unit 525 each clock cycle. The details of the texture sampler and header unit 500 are described in conjunction with FIG. 5B.

The data packet logic 525 receives the texture coordinates read from the texture transpose buffer 515 and the texture sampler and texture header from the operation translation unit 505. The data packet logic 525 constructs texture addresses that is used to sample (read) texture data from the texture map specified by the texture identifier included in the texture header. The texture sampler specifies a sampling pattern that is used to sample the texture data from the texture map and filter the texture data to produce filtered texels. The texture read unit 530 receives the texture addresses and reads the texture data. The texture data is received by the texture filter unit 535 and filtered according to the texture sampler to produce filtered texels.

Figure 5B:
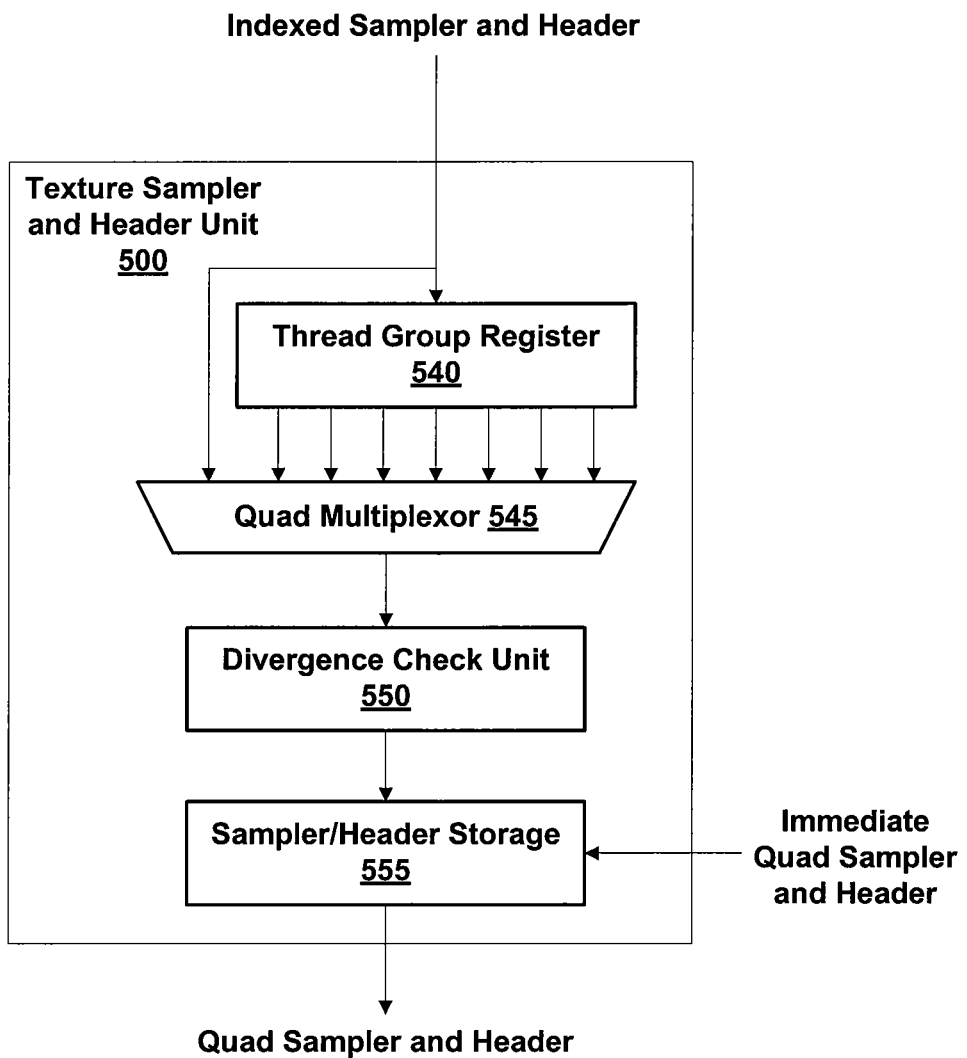
FIG. 5B is a block diagram of the texture sampler and header unit of FIG. 5A, according to one embodiment of the present invention.

FIG. 5B is a block diagram of the texture sampler and header unit 500 of FIG. 5A, according to one embodiment of the present invention. When the texture sampler and header unit 500 receives non-indexed texture sampler and header values from the operation translation unit 505, the texture header value and the texture sampler value are stored in the sampler/header storage 555 and output for each quad in the thread group that has at least one active thread. Since there can be variable number of transactions (active quads or divergent pixels) for each thread group of texture operation instruction, a "last" bit in is used to indicate that the current transaction is the last transaction of the whole thread group. The last bit may be output from the texture sampler and header unit 500 to the operation translation unit 505 with the texture sampler and texture header values for the last quad in the thread group if there is no divergence within the quad, or sent with the last pixel within the quad if there is divergence between the pixels in the quad.

A thread group register 540 and a quad multiplexer 545 receive the indexed texture samplers and texture headers for a thread group that are output by the texture transpose buffer 515. The thread group register 540 stores all but one of the per-quad texture samplers and texture headers for the thread group since the one per-quad texture samplers and texture headers may be selected by the quad multiplexor 545 for output during the first clock cycle. Each clock cycle that the divergence check unit 550 will accept new texture samplers and texture headers, the quad multiplexor 545 outputs four texture samplers and texture headers (one texture sampler and one texture header for each pixel) when at least one thread processing a pixel in the quad is active.

Since each transaction output to the operation translation unit 505 can only contain one texture header value and one texture sample value, in the case of indexed texture headers and samplers, the divergence check unit 550 needs to check whether either of the one texture header value and one texture sampler value within a pixel quad is "divergent," meaning that a texture header value or a texture sampler value for an active pixel differs from the texture header value or texture sampler value for another active pixel within the same pixel quad. The lowest number pixel within the pixel quad that is processed by an active thread is selected by the divergence check unit 550. The texture header value and texture sampler value for the selected pixel is compared against the texture header values and texture sampler values for the other pixels in the pixel quad that are processed by active threads. If all pixels in a pixel quad "point to" the same texture header and texture sampler, only one lookup is needed.

One possible approach to handle a diverging quad is that any pixels within the pixel quad with matching texture header and texture sampler values can be issued together with the lowest number active pixel in the same transaction. The texture header and texture sampler values for any diverging pixels are issued in subsequent transactions. Alternatively, when any pixel diverges each pixel within the pixel quad that is processed by an active thread is output in sequence. As a result, a single pixel quad can generate up to four transactions, each with only one pixel active. When the texture operation instruction is non-indexed, all pixels within the each pixel quad and within the thread group are guaranteed to have the same texture header value and texture sampler value, and hence no divergence will occur. The transactions that include a single texture header and single texture sampler are buffered in the sampler header storage 550 for output to the operation translation unit 505.

Figure 6:
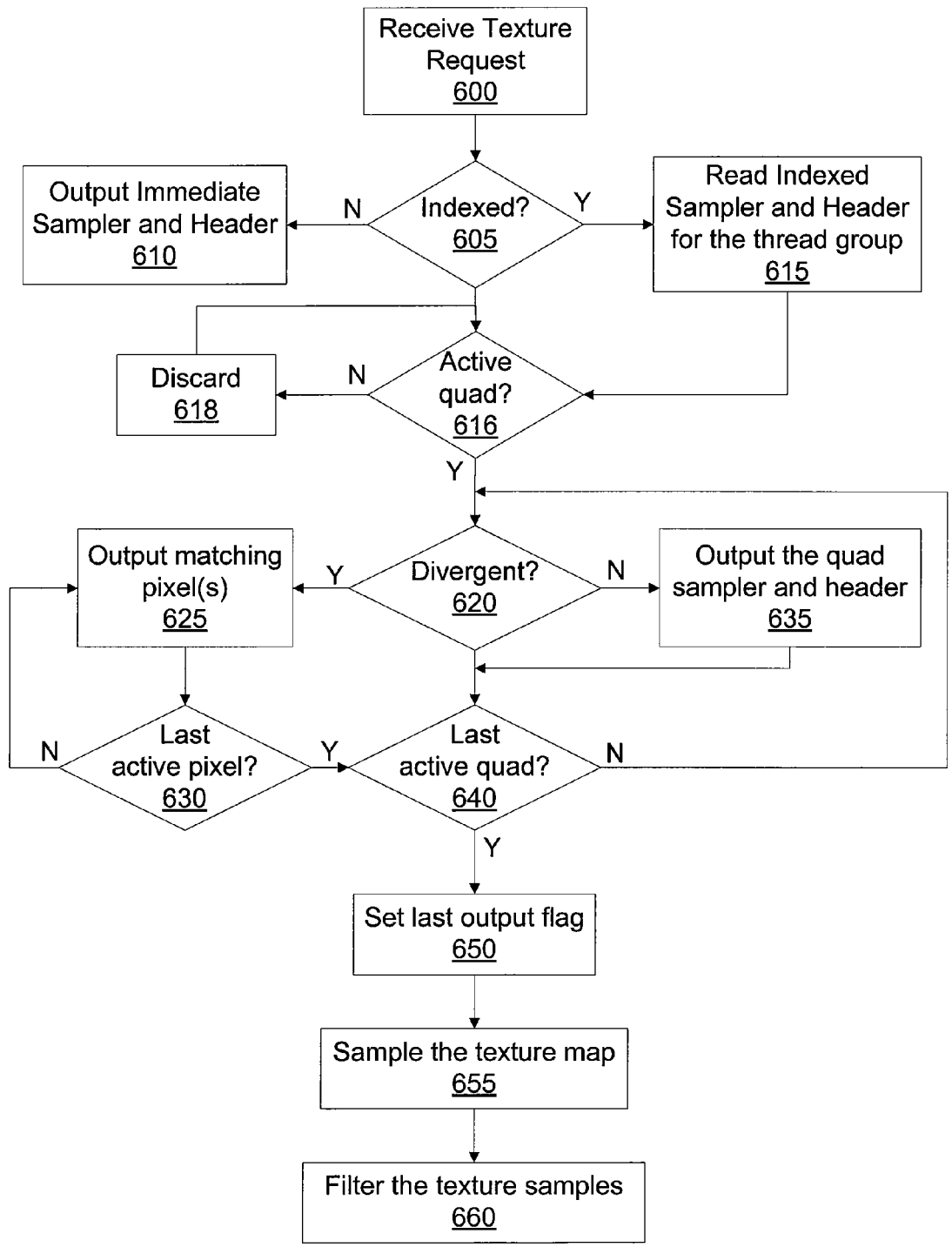
FIG. 6 is a flow diagram of method steps for determining the texture sampler and header specified for a texture operation, according to one embodiment of the present invention.

FIG. 6 is a flow diagram of method steps for determining the texture sampler and header specified for a texture operation instruction, according to one embodiment of the present invention. At step 600 a texture request is received from the SPM 310. A texture request is produced by the SPM 310 after the texture coordinates for a texture operation instruction have been stored in the texture transpose buffer 515. At step 605, the operation translation unit 505 determines if the texture operation instruction specifies an index associated with the texture sampler, i.e., if the .I specifier is TRUE. If the texture operation instruction does not specify an index, then at step 610 the operation translation unit 505 outputs the immediate texture sampler and texture header to the texture sampler and texture header unit 500 and receives (from the texture sampler and header unit 500) a copy of the texture sampler and texture header for each quad in the thread group that has at least one active thread.

If, at step 605, the operation translation unit 505 determines that the texture operation instruction does specifies an index, then at step 615 the operation translation unit 505 outputs a read request with the texture sampler index and the texture header index and the texture transpose buffer 515 reads the texture samplers and texture headers for the thread group. At step 616 the texture sampler and header unit 500 determines if at least one of the threads in the thread group that process a first pixel quad are active, and, if not, then at step 618 the texture samplers and texture headers for the first pixel quad are discarded and step 616 is repeated for the next quad. Note that at least one thread in the thread group is active in order for the texture unit 315 to receive the texture operation instruction for execution to process the thread group.

If at step 616 the texture sampler and header unit 500 determines that at least one of the threads in the thread group that process the quad is active, then at step 620 the texture sampler and header unit 500 determines if the texture samplers and texture headers read for the pixel quad are divergent. If, the texture samplers and texture headers for the pixel quad are not divergent, then at step 635 the texture header and texture sampler for the quad are output by the texture sampler and header unit 500 and the texture sampler and header unit 500 proceeds directly to step 640. Otherwise, at step 625 the texture sampler and header unit 500 outputs the texture sampler and texture header for the first pixel and other pixels in the pixel quad that are non-divergent (matching pixels). At step 630 the texture sampler and header unit 500 determines if the matching pixels include the last active pixel for the pixel quad, and, if not, then steps 625 and 630 are repeated for the next active pixel that did not match a previously matched pixel for the pixel quad. If, at step 630 the matching pixels did include the last active pixel, then the texture sampler and header unit 500 proceeds directly to step 640.

At step 640 the texture sampler and header unit 500 determines if the texture sampler and the texture header for the last active pixel quad was output in step 625 or step 635, and, if not, then the texture sampler and header unit 500 returns to step 620 to process the next pixel quad. Otherwise, at step 650 the texture sampler and header unit 500 outputs the last output flag with the last texture sampler and texture header that was output. At step 655 the texture read unit 530 samples the texture data based on the texture sampler and texture header. At step 660 the texture filter unit 535 filters the sampled texture data to produce filtered texture data for a pixel.

The texture unit 315 is configured to support texture operation instructions that specify an index for a texture sampler and an index for a texture header. The index for the texture sampler and the index for the texture header may be determined dynamically during execution of a shader program. Using an index allows for greater flexibility and control in performing texture mapping operations.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for dynamically determining a texture sampler for a texture operation instruction, comprising:
   receiving the texture operation instruction;
   determining that the texture operation instruction specifies
      a first register included in a multi-threaded processor, the first register storing a first index associated with the texture sampler;

reading the texture sampler from a second register included in the multi-threaded processor using the first index;
sampling texture data according to a sampling pattern corresponding to the texture sampler; and
filtering the sampled texture data to produce filtered texture data for a pixel.

2. The method of claim 1, further comprising the steps of:
determining that the texture operation instruction specifies a second index associated with a texture header;
reading the texture header from a third register using the second index; and
sampling the texture data from a texture map corresponding to the texture header.

3. The method of claim 2, wherein the texture operation instruction is configured for multi-threaded execution to process a group of pixel quads including multiple pixels and the texture header includes a separate texture header for each one of the pixels in the pixel quads.

4. The method of claim 3, further comprising the steps of:
determining that a first texture header for a first pixel in a pixel quad and a second texture header for a second pixel in the pixel quad are different;
sampling a first portion of the texture data from a first texture map corresponding to the first texture header; and
sampling a second portion of the texture data from a second texture map corresponding to the second texture header.

5. The method of claim 2, further comprising, prior to the step of receiving the texture operation instruction, writing the texture header into the third register.

6. The method of claim 1, wherein the texture operation instruction is configured for multi-threaded execution to process a group of pixel quads including multiple pixels and the texture sampler includes a separate texture sampler for each one of the pixels in the pixel quads.

7. The method of claim 6, further comprising the steps of:
determining that a first texture sampler for a first pixel in a pixel quad and a second texture sampler for a second pixel in the pixel quad are different;
sampling a first portion of the texture data according to a sampling pattern corresponding to the first texture sampler; and
sampling a second portion of the texture data according to a sampling pattern corresponding to the second texture sampler.

8. The method of claim 1, further comprising, prior to the step of receiving the texture operation instruction, writing the texture sampler into the second register.

9. A computer-readable storage medium storing instructions that, when executed by a processor, cause the processor to dynamically determine a texture sampler for a texture operation instruction, by performing the steps of:
receiving the texture operation instruction;
determining that the texture operation instruction specifies a first register included in a multi-threaded processor, the first register storing a first index associated with the texture sampler;
reading the texture sampler from a second register included in the multi-threaded processor using the first index;
sampling texture data according to a sampling pattern corresponding to the texture sampler; and
filtering the sampled texture data to produce filtered texture data for a pixel.

10. A system for dynamically determining a texture sampler for a texture operation instruction, the system comprising:
a multi-threaded processor including a texture unit configured to:
receive the texture operation instruction;
determine that the texture operation instruction specifies a first register included in the multi-threaded processor, the first register storing a first index associated with the texture sampler;
read the texture sampler from a second register included in the multi-threaded processor using the first index;
sample texture data according to a sampling pattern corresponding to the texture sampler; and
filter the sampled texture data to produce filtered texture data for a pixel.

11. The system of claim 10, further comprising a memory storing instructions that, when executed by the multi-threaded processor, configures the multi-threaded processor to:
receive the texture operation instruction;
determine that the texture operation instruction specifies the first index;
read the texture sampler;
sample the texture data; and
filter the sampled texture data.

12. The system of claim 10, wherein the texture unit is further configured to:
determine that the texture operation instruction specifies a second index associated with a texture header;
read the texture header from a third register using the second index; and
sample the texture data from a texture map corresponding to the texture header.

13. The system of claim 12, wherein the texture operation instruction is configured for multi-threaded execution to process a group of pixel quads including multiple pixels and the texture header includes a separate texture header for each one of the pixels in the pixel quads.

14. The system of claim 13, wherein the texture unit is further configured to:
determine that a first texture header for a first pixel in a pixel quad and a second texture header for a second pixel in the pixel quad are different;
sample a first portion of the texture data from a first texture map corresponding to the first texture header; and
sample a second portion of the texture data from a second texture map corresponding to the second texture header.

15. The system of claim 12, wherein the texture unit is further configured to write the texture header into the third register prior to receiving the texture operation instruction.

16. The system of claim 10, wherein the texture operation instruction is configured for multi-threaded execution to process a group of pixel quads including multiple pixels and the texture sampler includes a separate texture sampler for each one of the pixels in the pixel quads.

17. The system of claim 16, wherein the texture unit is further configured to:
determine that a first texture sampler for a first pixel in a pixel quad and a second texture sampler for a second pixel in the pixel quad are different;
sample a first portion of the texture data according to a sampling pattern corresponding to the first texture sampler; and
sample a second portion of the texture data according to a sampling pattern corresponding to the second texture sampler.

18. The system of claim 10, wherein the texture unit is further configured to write the texture sampler into the second register prior to receiving the texture operation instruction.

* * * * *